(12) United States Patent
Chen

(10) Patent No.: US 7,873,106 B2
(45) Date of Patent: *Jan. 18, 2011

(54) METHOD AND APPARATUS FOR SYNCHRONIZED RECORDING OF AUDIO AND VIDEO STREAMS

(75) Inventor: Cheng-Che Chen, Kao-Hsiung (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1427 days.

This patent is subject to a terminal disclaimer.

(21) Appl. No.: 11/306,295

(22) Filed: Dec. 21, 2005

(65) Prior Publication Data

US 2006/0198447 A1 Sep. 7, 2006

Related U.S. Application Data

(63) Continuation-in-part of application No. 10/906,457, filed on Feb. 21, 2005, now Pat. No. 7,634,005.

(60) Provisional application No. 60/522,859, filed on Nov. 15, 2004.

(51) Int. Cl.
*H04N 7/12* (2006.01)
*H04B 1/66* (2006.01)

(52) U.S. Cl. .................................. 375/240.1

(58) Field of Classification Search ........................ None
See application file for complete search history.

(56) References Cited

U.S. PATENT DOCUMENTS

| 5,481,543 | A | 1/1996 | Veltman |
| 5,808,722 | A | 9/1998 | Suzuki |
| 6,163,647 | A | 12/2000 | Terashima |
| 6,404,818 | B1 | 6/2002 | Obikane |
| 6,744,815 | B1 | 6/2004 | Sackstein et al. |
| 7,509,029 | B2 * | 3/2009 | Nonaka et al. ............... 386/124 |
| 2006/0104344 | A1 | 5/2006 | Chen |

FOREIGN PATENT DOCUMENTS

| DE | 10 2005 050 32 A1 | 6/2006 |
| EP | 0 268 481 A2 | 5/1988 |
| EP | 0 667 713 A2 | 8/1995 |
| EP | 1 549 062 A1 | 6/2005 |
| JP | 2001-339679 A | 12/2001 |
| JP | 2005-045829 A | 2/2005 |

* cited by examiner

*Primary Examiner*—Nhon T Diep
(74) *Attorney, Agent, or Firm*—Winston Hsu; Scott Margo

(57) ABSTRACT

A method for synchronized recording of audio and video signals is disclosed. The video signals are grouped into a plurality of video frames. The method includes incrementing a counter value of an audio counter when at least an audio frame associated with the audio signals is encoded, and recording the current counter value of the audio counter when a video frame is received.

8 Claims, 4 Drawing Sheets

METHOD AND APPARATUS FOR SYNCHRONIZED RECORDING OF AUDIO AND VIDEO STREAMS

CROSS REFERENCE TO RELATED APPLICATIONS

This is a continuation-in-part of the co-pending U.S. application Ser. No. 10/906,457, which was filed on Feb. 21, 2005 and is included herein by reference, and claims the benefit of the co-pending U.S. application Ser. No. 10/906,457 and the provisional application No. 60/522,859, which was filed on Nov. 15, 2004 and is included herein by reference.

BACKGROUND

The present invention relates to a method and apparatus for recording of audio and video streams, and particularly, to a method and apparatus for synchronized recording of audio and video streams.

Methods and systems for synchronized recoding audio and video streams are known in the art. Generally, the encoding process consists of three stages. The first stage is digitizing the analog audio source and video source. The audio source is composed of a plurality of audio samples. Similarly, the video source is composed of a plurality of video frames. The second stage is compression of the digital audio and video frames to separately create an audio stream and a video stream. The audio stream is composed of a plurality of compressed audio frames. The video stream is composed of the plurality of compresses video frames. The third stage is multiplexing the audio and video streams into a single stream. The decoding process consists of inversing each of these stages and applying them in the reverse order.

Please refer to FIG. 1. FIG. 1 is a block diagram of a traditional encoding system 10. The encoding system 10 includes an audio encoder 20, a video encoder 30, and a multiplexer 40. The audio encoder 20 includes an audio analog to digital converter (A/D) 22 and an audio compressor 24. The video encoder 30 includes a video A/D 32 and a video compressor 34. The audio compressor 24 is connected to the audio A/D 22 and to the multiplexer 40. The video compressor 34 is connected to the video A/D 32 and to the multiplexer 40. An A/D converter is also known as a digitizer.

Unfortunately, when the audio signals output from the audio encoder 20 and the video signals output from the video encoder 30 reach the multiplexer 40, there is no way to know exactly when the audio and video signals were digitized. That is, audio signals that were digitized at a certain time should be associated with video signals that were digitized at the same time. Since the audio compressor 24 and the video compressor 34 do not always compress signals at the same rate, the compressed audio frame and its corresponding compressed video frame may not reach the multiplexer 40 at the same time. In addition, the timing information of digitalizing the analog audio source and video source in the audio A/D converter 22 and video A/D converter 32 are lost while the video and audio streams are inputted to the multiplexer 40, and therefore the video and audio streams will be out-of-synchronization.

To solve this problem, Sackstein, et al. proposes an encoding system in U.S. Pat. No. 6,744,815, which is herein incorporated by reference. Please refer to FIG. 2, which is a block diagram of an encoding system 100 according to the related art. Encoding system 100 includes an audio encoder 110, a video encoder 130, an audio buffer 140, a video buffer 144, a controller 142, and a multiplexer 150. The audio encoder 110 includes an audio A/D converter 114, an audio compressor 120, and an audio clock 112 connected to the audio A/D converter 114 and to an audio source. The video encoder 130 includes a video A/D converter 134, a video compressor 136, and a video clock 132 connected to the video A/D converter 134 and to a video source.

The audio buffer 140 is connected to the audio compressor 120, the controller 142, and the multiplexer 150. The video buffer 144 is connected to the video compressor 136, the controller 142, and the multiplexer 150. The audio compressor 120 includes an input buffer 122, for temporal storage of audio samples, and a CPU 124, connected therebetween. The controller 142 is further connected to the input buffer 122. The audio A/D converter 114 provides digital audio samples to the compressor 120 at a rate dictated by its sampling audio clock 112. The compressor 120 has no knowledge of the pass of time except through the samples that arrive at its input.

As mentioned above, the audio compressor 24 and the video compressor 34 do not always compress signals at the same rate, and in order to obtain the encoding rate difference between the audio compressor 24 and the video compressor 34, the CPU 124 stores the compressed audio frames (audio samples) in the audio buffer 140 and the video compressor 136 stores the compresses video frames in the video buffer 144, and therefore, the controller 142 can know the encoding rate difference between the audio compressor 24 and the video compressor 34 by analyzing the number of audio samples in the audio buffer 140 and the number of the video frames in the video buffer 144 by increasing or decreasing the number of audio samples in the input buffer 122, the audio and video streams can be synchronized and multiplexed together in the multiplexer 150.

After analyzing the contents of the audio buffer 140 and the video buffer 144, the controller 142 provides feedback to the input buffer 122 for altering the audio samples contained in the input buffer 122. For instance, decrementing the write pointer in the input buffer 122 decreases the number of audio samples therein, while duplicating an audio sample in the input buffer 122 increases the number of audio samples therein.

Accordingly, the conventional encoding system 100 is only able to achieve synchronized recording of the audio and video steams by removing or adding audio samples stored in the input buffer 122 while the error of audio/video synchronization occurs.

SUMMARY

It is therefore an objective of the claimed invention to provide a method and apparatus for synchronized recording of audio and video streams in order to solve the above-mentioned problems.

According to an embodiment of the present invention, a method for synchronized recording of audio and video signals is disclosed. The video signals are grouped into a plurality of video frames. The method includes incrementing a counter value of an audio counter when at least an audio frame associated with the audio signals is encoded; and recording the current counter value of the audio counter when a video frame is received.

Additionally, an apparatus for synchronized recording of audio and video signals is also disclosed. The video signals are grouped into a plurality of video frames. The apparatus comprises an audio counter for incrementing a counter value when at least an audio frame associated with the audio signals is encoded; and a time stamp buffer for recording the current counter value of the audio counter when a video frame is received.

It is an advantage of the present invention that the video signals are time stamped in terms of the number of encoded (compressed) audio frames. In this way, the video signals can be properly and accurately synchronized with the audio signals for creating a synchronized recording of audio and video streams.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
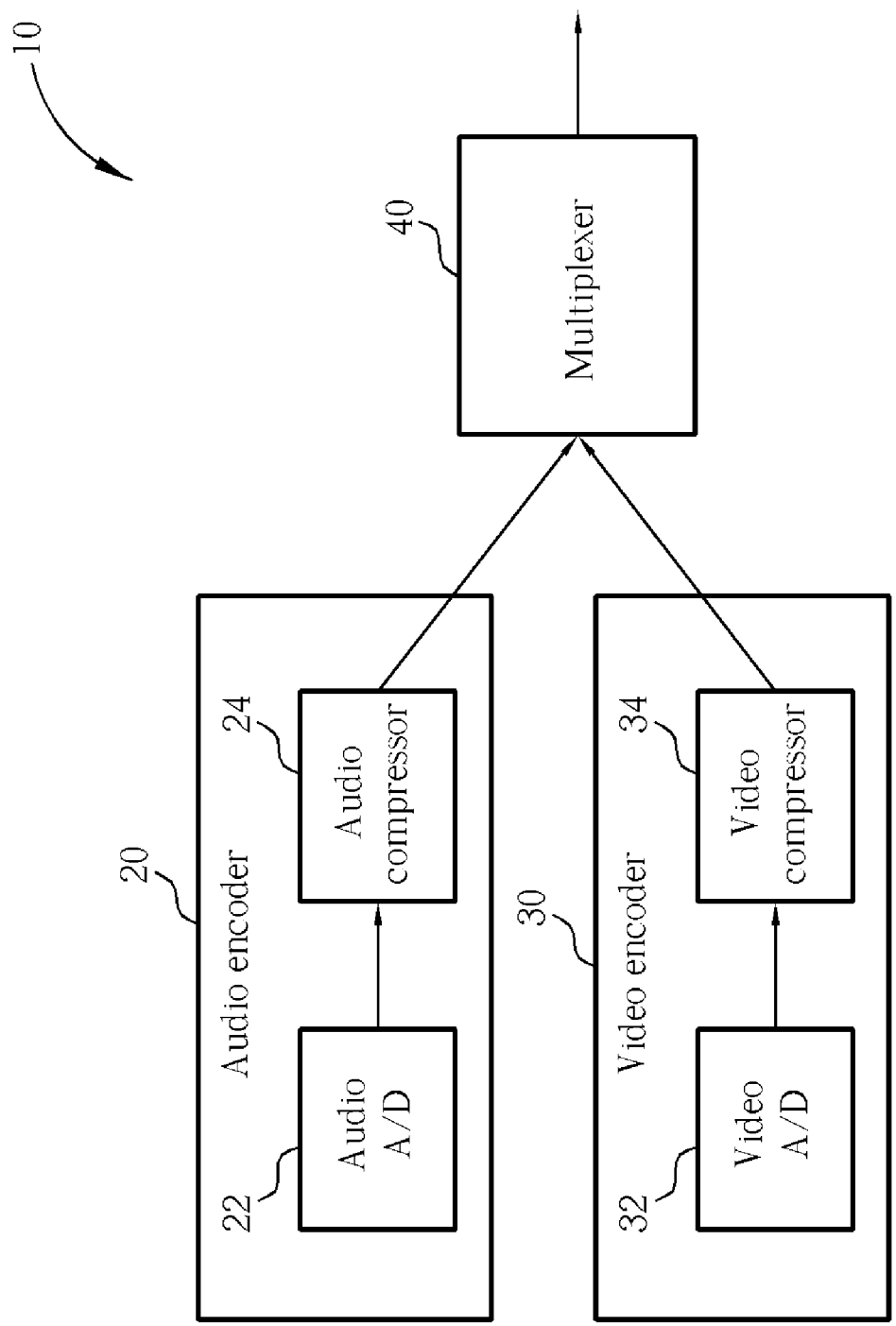
FIG. 1 is a block diagram of a traditional encoding system.
Figure 2:
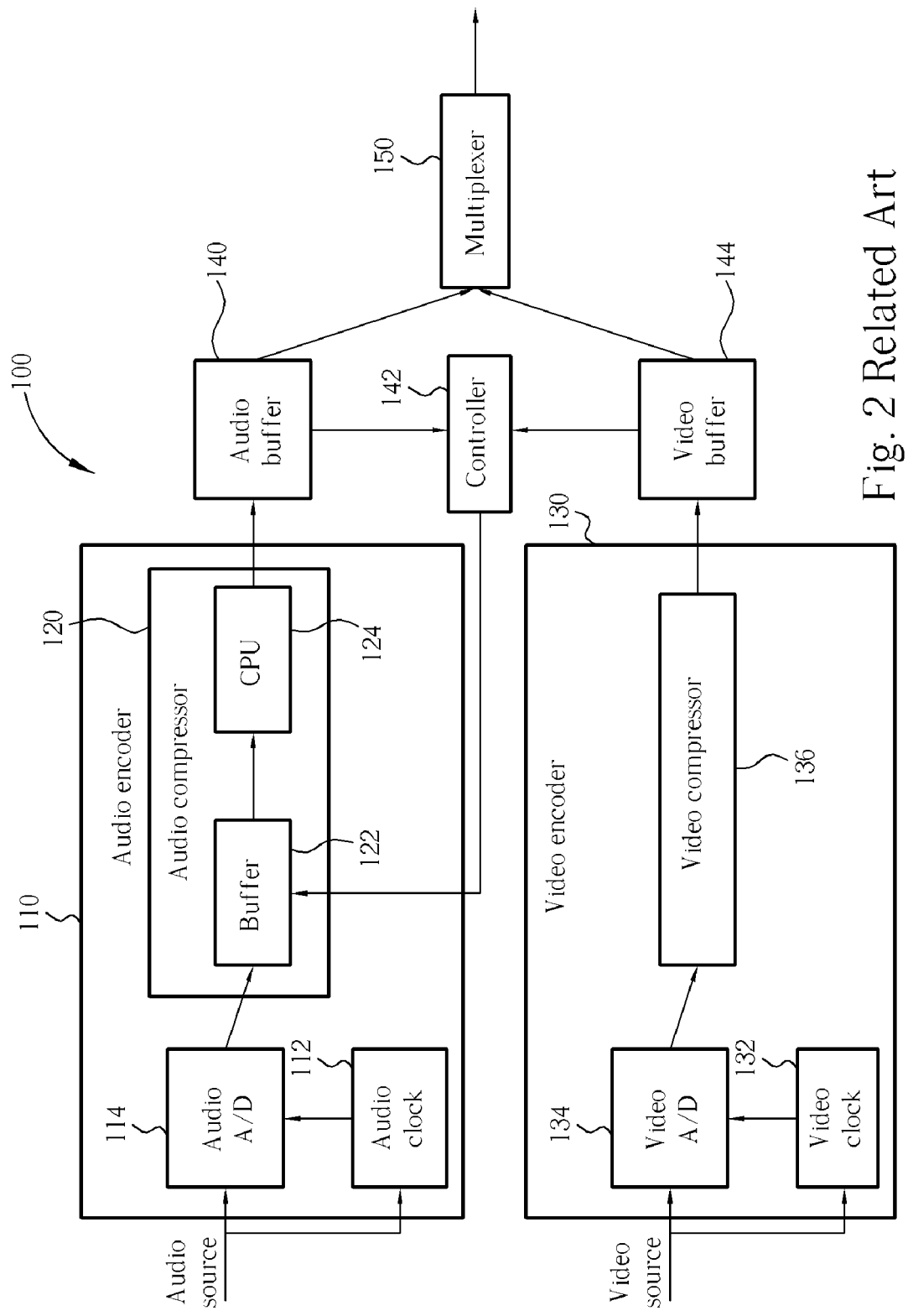
FIG. 2 is a block diagram of another encoding system according to the related art.
Figure 3:
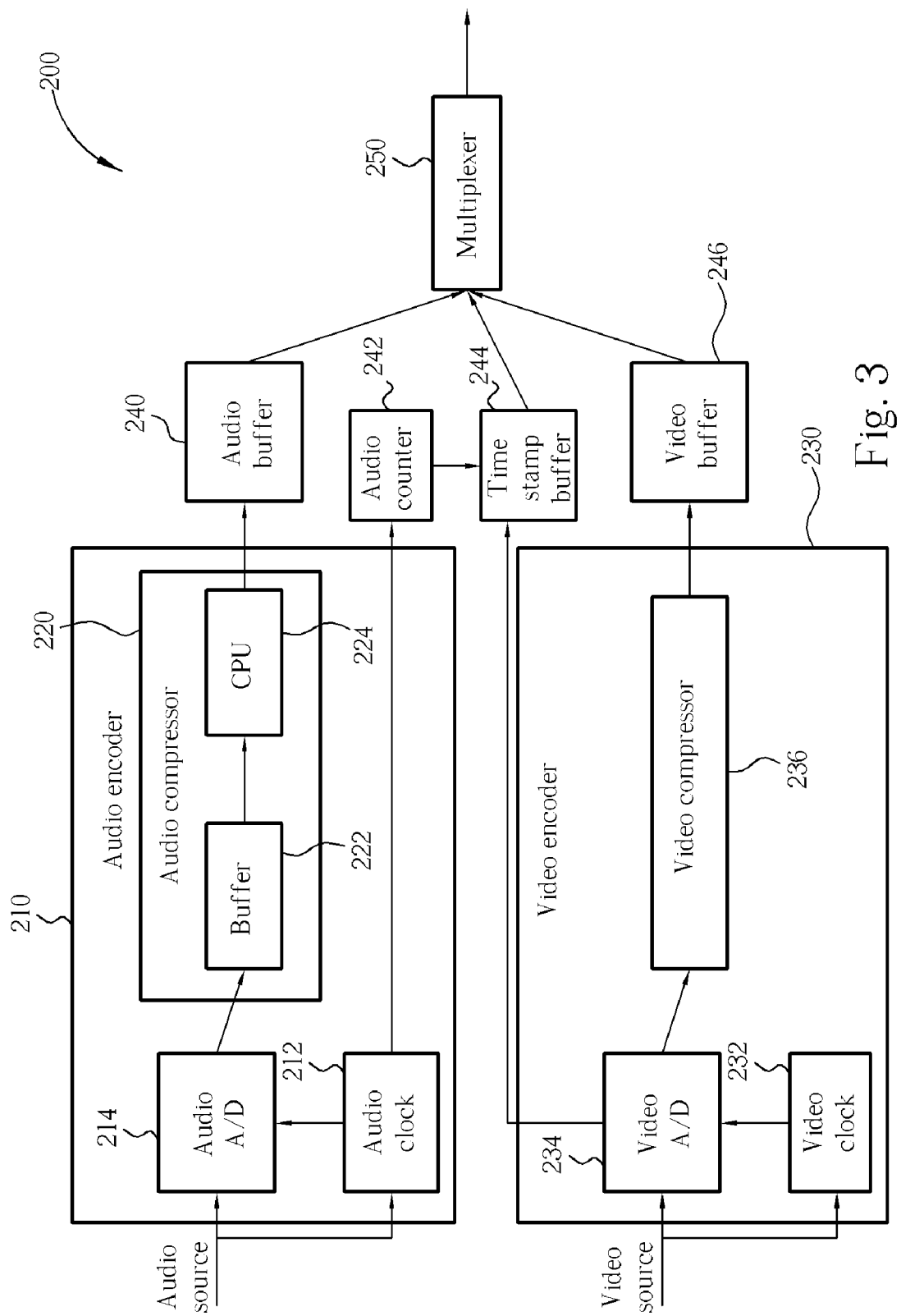
FIG. 3 is a functional block diagram of an encoding system according to a first embodiment of the present invention.

Please refer to FIG. 3. FIG. 3 is a functional block diagram of an encoding system 200 according to a first embodiment of the present invention. Like the encoding system 100, the encoding system 200 includes an audio encoder 210, a video encoder 230, an audio buffer 240, a video buffer 246, and a multiplexer 250. Additionally, the present invention encoding system 200 also contains an audio counter 242 and a time stamp buffer 244, as will be explained below.

The audio encoder 210 includes an audio A/D converter 214, an audio compressor 220, and an audio clock 212 connected to the audio A/D converter 214 and to an audio source. The video encoder 230 includes a video A/D converter 234, a video compressor 236, and a video clock 232 connected to the video A/D converter 234 and to a video source.

The audio buffer 240 is connected to the audio compressor 220 and the multiplexer 250, and the video buffer 246 is connected to the video compressor 236 and the multiplexer 250. The audio compressor 220 includes an input buffer 222, for temporal storage of audio samples, and a CPU 224, connected therebetween.

The audio A/D converter 214 provides digital audio samples to the compressor 220 at a rate dictated by its sampling audio clock 212. The compressor 220 has no knowledge of the pass of time except through the samples that arrive at its input.

As the audio A/D converter 214 sequentially receives the audio samples from the audio source, the audio clock 212 is continuously running, and the audio counter 242 increments its counter value as clock pulses from the audio clock 212 are received. As the video A/D converter 234 receives one video frame from the video source, the video A/D converter 234 outputs a signal to the time stamp buffer 244 for indicating the receipt of a video frame. The time stamp buffer 244 then loads the current value of the audio counter 242 into the time stamp buffer 244 for recording the time at which the video frame enters the video A/D converter 234 in terms of the audio counter 242. Therefore, the encoded (compressed) audio frames are stored in the audio buffer 240, the encoded (compressed) video frames are stored in the video buffer 246, and the time stamps corresponding to the encoded (compressed) video frames are stored in the time stamp buffer 244. When multiplexing the audio and video streams in the multiplexer 250, the video frames stored in the video buffer 246, the audio frames stored in the audio buffer 240, and the time stamps corresponding to the video frames stored in the time stamp buffer 244 are multiplexed altogether.

Since time stamps created in terms of the audio counter 242 are assigned to corresponding video frames for synchronized recording of the video stream with the audio stream, the time-stamped video frames can be properly synchronized with the corresponding audio signals without encountering any errors of audio/video synchronization.

Figure 4:
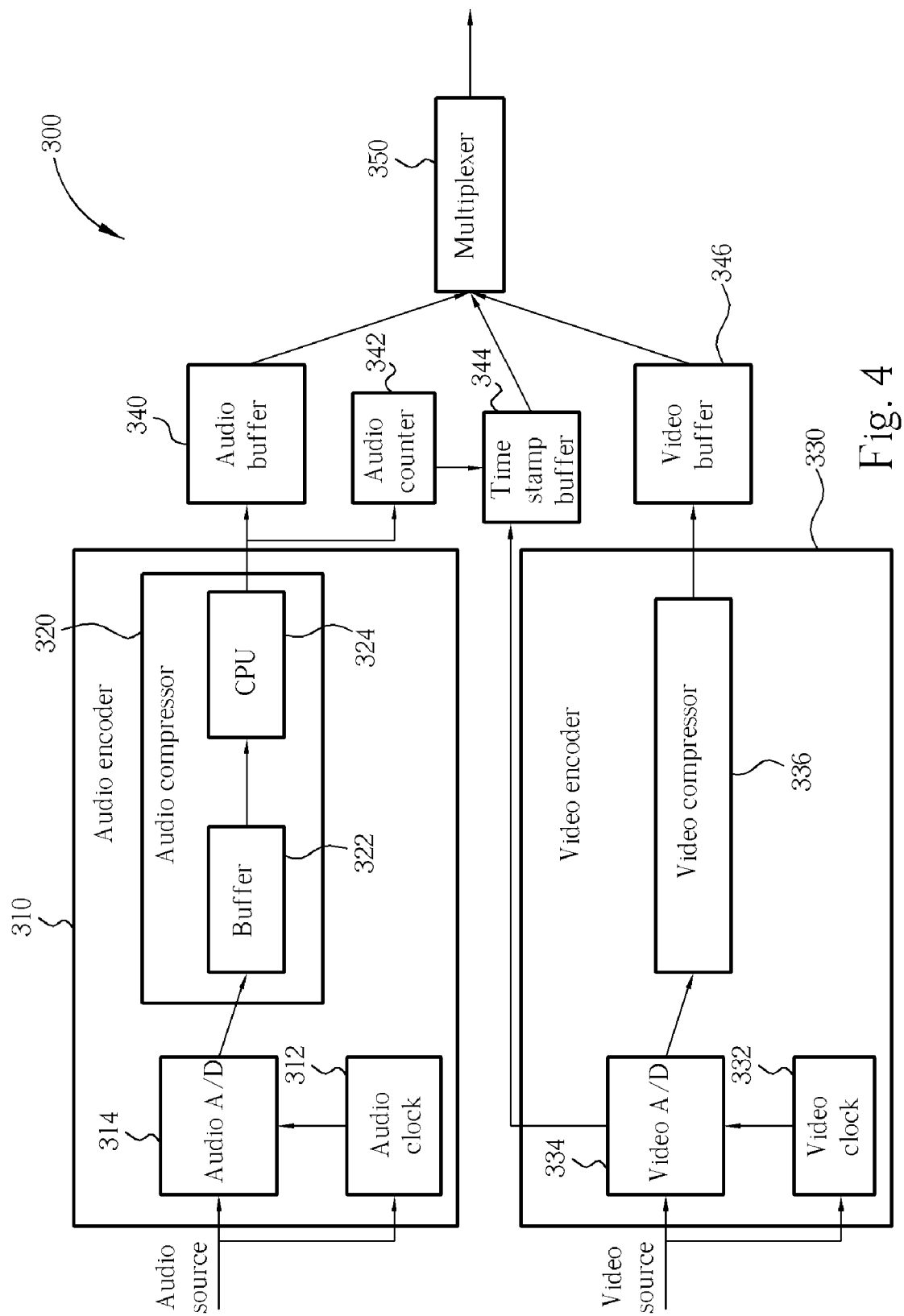
FIG. 4 is a functional block diagram of an encoding system according to a second embodiment of the present invention.

Please refer to FIG. 4. FIG. 4 is a functional block diagram of an encoding system 300 according to a second embodiment of the present invention. The encoding system 300 includes an audio encoder 310, a video encoder 330, an audio buffer 340, a video buffer 346, and a multiplexer 350. In addition, the encoding system 300 of the present invention also has an audio counter 342 and a time stamp buffer 344.

The audio encoder 310 includes an audio A/D converter 314, an audio compressor 320, and an audio clock 312 connected to the audio A/D converter 314 and to an audio source. The video encoder 330 includes a video A/D converter 334, a video compressor 336, and a video clock 332 connected to the video A/D converter 334 and to a video source.

The audio buffer 340 is connected to the audio compressor 320 and the multiplexer 350, and the video buffer 346 is connected to the video compressor 336 and the multiplexer 350. The audio compressor 320 includes an input buffer 322, for temporal storage of audio samples, and a CPU 324, connected therebetween. The architecture of the encoding system 300 shown in FIG. 4 is similar to that of the encoding system 200 shown in FIG. 3. The key difference between these two encoding systems 200, 300 is the audio counter 342 which counts the compressed audio frames processed by the CPU 324. Therefore, in this embodiment, the audio counter 342 increments its counter value as the audio compressor 320 finishes compression of one audio frame. It should be noted that other components of the same name in the encoding systems 200, 300 have the same functionality and operation, and further description is omitted here for brevity.

This embodiment is capable of achieving synchronized recording of the audio and video streams. The operation of synchronizing the audio stream recording with the video stream recording is detailed as follows. As the video A/D converter 334 receives one video frame from the video source, the video A/D converter 334 outputs a signal to the time stamp buffer 344 for indicating the receipt of a video frame. The time stamp buffer 344 then loads the current value of the audio counter 342 into the time stamp buffer 344, where the current value is generated through counting the compressed audio frames processed by the CPU 324. The current value is used for recording the time at which the video frame enters the video A/D converter 334. Therefore, the encoded (compressed) audio frames are stored in the audio buffer 340, the encoded (compressed) video frames are stored in the video buffer 346, and the time stamps corresponding to the encoded (compressed) video frames are stored in the time stamp buffer 344. When multiplexing the audio and video streams in the multiplexer 350, the video frames stored in the video buffer 346, the audio frames stored in the audio buffer 340, and the time stamps corresponding to the video frames stored in the time stamp buffer 344 are multiplexed altogether. As a result, the time-stamped video frames can be properly synchronized with the corresponding audio signals without encountering any errors of audio/video synchronization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for synchronized recording of audio and video signals, the video signals being grouped into a plurality of video frames, the method comprising:
    incrementing a counter value of an audio counter when at least an audio frame associated with the audio signals is compressed, wherein the counter value represents an index of the compressed audio frame;
    recording the current counter value of the audio counter when a video frame is received, wherein each recorded counter value represents a time stamp of the received video frame; and
    multiplexing an audio stream comprising the compressed audio frames, and a video stream comprising the received video frames with the recorded time stamps.

2. The method of claim 1, further comprising:
compressing the video frames,
wherein the time stamp associated with each compressed video frame is stored in a time stamp buffer.

3. The method of claim 2, further comprising:
    storing the compressed audio frames in an audio buffer; and
    storing the compressed video frames in a video buffer.

4. The method of claim 1, wherein the video frames are time stamped as the video frames are received for digitization.

5. An apparatus for synchronized recording of audio and video signals, the video signals being grouped into a plurality of video frames, the apparatus comprising:
    an audio counter for incrementing a counter value when at least an audio frame associated with the audio signals is compressed, wherein the counter value represents an index of the compressed audio frame;
    a time stamp buffer for recording the current counter value of the audio counter when a video frame is received, wherein each recorded counter value represents a time stamp of the received video frame; and
    a multiplexer for multiplexing an audio stream comprising the compressed audio frames, and a video stream comprising the received video frames with the recorded time stamps.

6. The apparatus of claim 5, further comprising:
an audio A/D converter for receiving the audio signals and digitalizing the audio signals;
a video A/D converter for receiving the video frames and digitalizing the video frames;
an audio compressor for compressing the digitalized audio signals to generate the compressed audio frames;
a video compressor for compressing the video frames; and
a time stamp buffer for storing the counter values.

7. The apparatus of claim 6, further comprising:
an audio buffer for storing the compressed audio frames; and
a video buffer for storing the compressed video frames.

8. The apparatus of claim 5, wherein the video frames are time stamped as the video frames are received for digitization.

* * * * *